United States Patent [19]

Tamura

[11] 4,434,933
[45] Mar. 6, 1984

[54] GAS FLOW RATE CONTROL SYSTEM

[75] Inventor: Akira Tamura, Aichi, Japan

[73] Assignee: CKD Controls Limited, Aichi, Japan

[21] Appl. No.: 320,975

[22] PCT Filed: Mar. 6, 1981

[86] PCT No.: PCT/JP81/00049
§ 371 Date: Nov. 2, 1981
§ 102(e) Date: Nov. 2, 1981

[87] PCT Pub. No.: WO81/02615
PCT Pub. Date: Sep. 17, 1981

[30] Foreign Application Priority Data

Mar. 8, 1980 [JP] Japan ............................. 55-29631

[51] Int. Cl.³ .................... G05D 15/00; F16K 51/00
[52] U.S. Cl. ............................. 236/75; 236/78 D;
251/137; 318/129
[58] Field of Search ............. 236/75, 78 D; 251/137;
318/122, 129, 130; 361/167

[56] References Cited

U.S. PATENT DOCUMENTS 3,169,215  2/1965  Bliss ........................... 251/137 X
3,942,485  3/1976  Suda et al. .................. 251/137 X
4,343,329  8/1982  Turansky et al. ............ 251/137 X

FOREIGN PATENT DOCUMENTS 51-15611   5/1976  Japan.
52-9053    2/1977  Japan.
55-178708 12/1980  Japan.

Primary Examiner—William E. Wayner
Attorney, Agent, or Firm—Wenderoth, Lind & Ponack

[57] ABSTRACT

A gas flow rate control system designed to control the gas flow rate by continuously controlling the opening of an electromagnetic valve, wherein the magnetic hysteresis of a plunger and a yoke which are magnetic material forming the magnetic circuit is removed by alternately passing current pulses through two energizing coils, so as to continuously reverse the direction of magnetization of the magnetic circuit and wherein the static friction between the plunger and the yoke is removed by oscillating the plunger.

1 Claim, 6 Drawing Figures

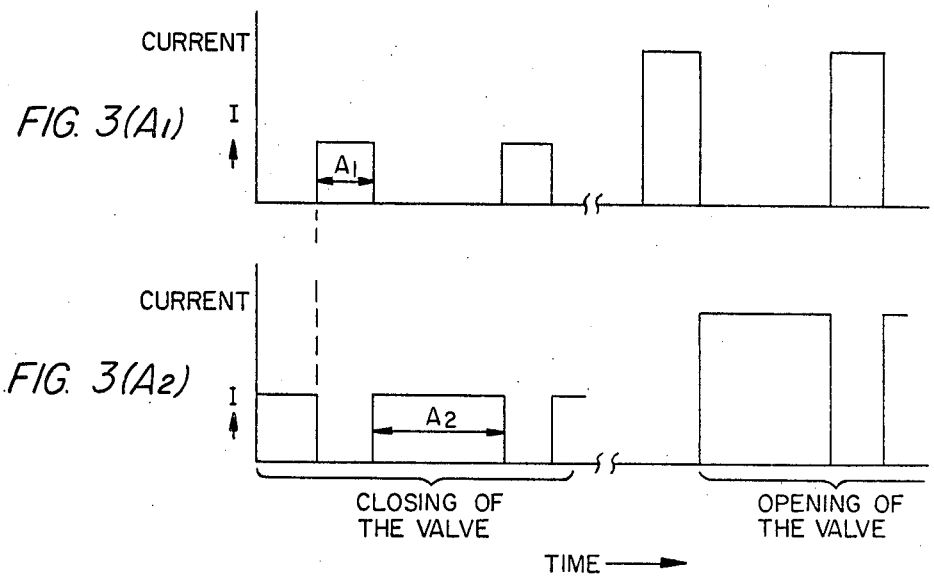
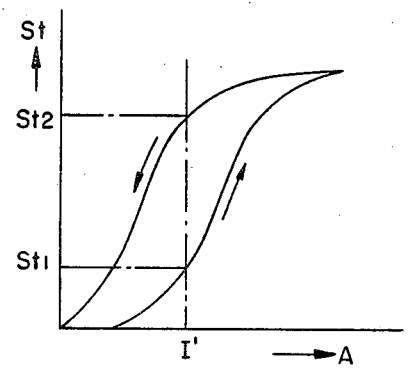
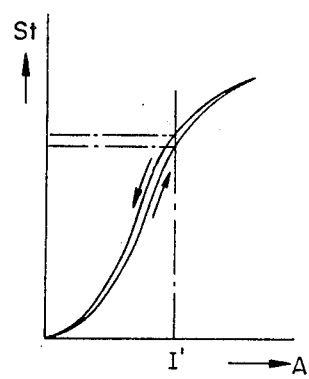

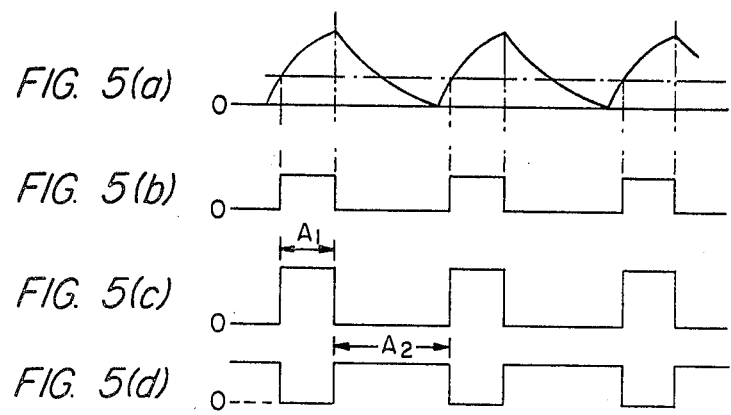
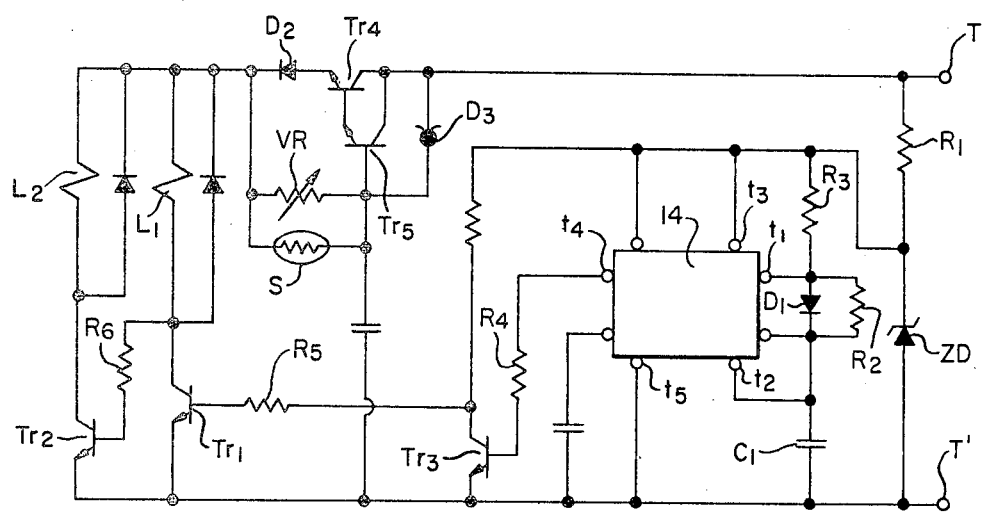

GAS FLOW RATE CONTROL SYSTEM

BACKGROUND OF THE INVENTION

1. Field of the Invention

The present invention relates to a gas flow rate control system with an electromagnetic solenoid valve, which is designed to continuously and accurately control the extent of opening of the solenoid valve, whereby the reliability of the temperature control is improved.

2. Description of the Prior Art

Recently, energy saving has increasingly been one of the most urgent questions in daily life in connection with the oil crisis that the world's countries confront, and in this respect, there is the requirement or order set in motion, as one of the essential countermeasures for energy savings, to set a guide line for the proper heating temperatures at business offices and general households. It has often come into question that there are many facilities such as business offices, department stores or the like which are heated at much higher temperatures than necessary, and thus wastefully consuming valuable energy resources such as the fuel gas, etc. Under these circumstances, energy saving is essentially directed to the elimination of such wastefulness in the heating of buildings and housing by defining the heating temperature at a relatively low or moderate level.

For observing such a guideline of a moderate heating temperature, it is somehow essential to constantly monitor the room temperatures and positively control the supply rate of fuel gas for heating. In this connection, if the control system turns out to be too expensive, it is natural that the users would suffer from a substantial economical burden and thus such an expensive system could not be adopted in common use. As a consequence, it is required that such a system which is operable with ease and accuracy would be marketed at as low a price as possible. The conventional control system is of a construction in which an electromagnet or solenoid valve is incorporated for the control of room temperatures by turning the supply of fuel gas on or off in accordance with a current room temperature. Although these electromagnet valves are generally advantageous in being low cost, it is inevitable that the room temperature repeatedly goes up-and-down rather than remaining constant with such on and off switching of the electromagnetic valve. In this consideration, there has been proposed the arrangement such that an electromagnet valve that is less expensive in cost is adopted so as to have its opening controlled in a continual mode instead of in the on and off switching mode.

This continual control mode of the electromagnet valve that has now been made available is generally attained through the improvement on the part of the valve per se. It is generally known that when the plunger for driving a valve stem is controlled with the intensity of the energizing current of the solenoid or energizing coil, the plunger is magnetically attracted by a magnet yoke so as to contact therewith; therefore, the plunger would start its motion by overcoming a static friction force caused therebetween. In this condition, the plunger would naturally start its jumping motion as the very moment that the magnetic attraction from the solenoid overcomes the static friction force. In order to prevent such a quick motion, there is proposed such a construction that the plunger is held in a neutral position by using such an aid as a leaf spring, so as to provide a space between the plunger and the magnet yoke. Such an arrangement would disadvantageously provide an added magnetic reluctance, and it is inevitable that the solenoid is designed to be larger to a certain extent than otherwise required, and also the energizing current is increased substantially. In addition, there is such a disadvantage that due to the hysteresis of the magnetic material constituting the magnetic circuit, such as plunger and yoke, there would occur an unequal opening of the valve when powered in its opening direction versus its closing direction with an equal driving current. As a consequence thereof, it is unavoidable that there would eventually occur an uncontrolled extent of deviation between a current ambient temperature and an opening of the valve, and this particular extent of deviation would not be consistent.

It is also known that there is proposed such measures for coping with such undesirable problem as mentioned above by disposing a moving coil which is provided in a floating relationship with a ring-shaped permanent magnet for the purpose of driving the valve stem. However, this arrangement cannot be relieved from such disadvantages that the permanent magnet would change its performance characteristics when given an impact and that it needs lead connection to its moving coil; it would therefore become complex in construction and hence expensive in its manufacturing cost.

SUMMARY OF THE INVENTION

It is an object of the present invention to provide a positive solution in an attempt to clear away all such problems particular to the continuous flow rate control valve designed for the temperature control as mentioned above, and provide a flow rate control valve which is free from any of such problems as magnetic hysteresis and static friction and which can positively and accurately correspond to any changes in the ambient temperature. For the purpose of attaining such an object, there is provided such arrangement in accordance with the present invention that there are two energizing coils which are fed alternately with current pulses in such a manner that the magnetic field of one coil is opposite in direction to that of the other, and that a movable core is caused to oscillate at the point of zero magnetic force which occurs at the moment of shifting from one energizing coil to the other. With such a construction, it is advantageous that as the direction of a current magnetic flux in the magnetic circuit is caused to be reversed continuously in accordance with a cycle of a pulse of current, the magnetic hysterisis is therefore constantly and efficiently cancelled and the static friction is eliminated by the oscillating motion of the movable core, thus causing the motion of the movable core to be smooth.

BRIEF DESCRIPTION OF THE DRAWING

In the drawing that shows the preferred embodiment of the present invention;

FIGS. 3($A_1$)–3($A_2$) and 5(*a*)–5(*d*) are timing charts showing the waveforms of current for energizing the energizing coils;

FIGS. 4(a) and 4(b) are diagrams showing the difference in the hysteresis characteristics of the conventional system and the one in accordance with the present invention; and FIG. 6 is a circuit diagram showing the control circuit for the system of the invention.

Figure 1:
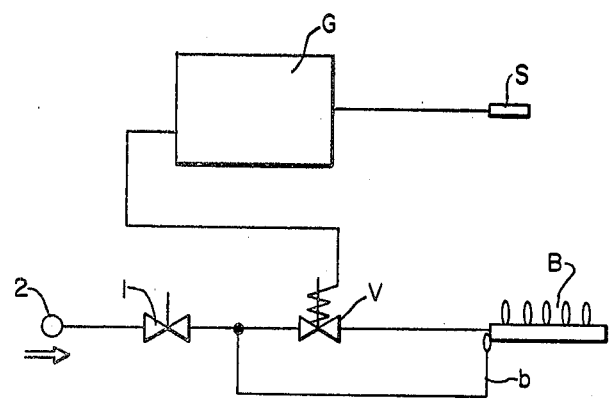
FIG. 1 is a schematic piping diagram showing the fuel burning system.

In the drawings, S designates a temperature sensor; G is a control circuit; B is a burner; V is a control valve for continuously controlling the gas flow rate; 1 is a switching valve; 2 is a gas supply; 3 is a plunger; 4 and 8 are yokes; 5 is a coil 1; 5' is a coil 2; 6 is a guide pipe; 7 is a spacer; 9 is a magnetism intensifier spacer; 10 is an E-ring; 11 is a diaphragm holding disc; 12 is a diaphragm; 13 is a valve stem; 14 is a timing IC; 15 is a bottom end cover; 16 is a valve and spring stopper; 17 is a spring; 23 is a regulating screw for setting a minimum flow rate of the valve; 24 is a top cover; 25 is a packing; and $D_3$ is a constant current diode.

DESCRIPTION OF THE EMBODIMENT

Now, a gas flow rate control system which uses an electromagnetic valve according to the present invention will be described by way of a preferred embodiment thereof. FIG. 1 is a piping diagram of the fuel burning system in which the gas flow rate control system according to the present invention is embodied. B designates a burner which is connected by piping to a gas supply 2 through a continuous type gas flow rate control valve V and a switching valve 1. b Designates a nozzle for a pilot flame, which is connected through piping between the flow rate control valve V and the switching valve 1. There is provided a temperature sensor S, such as a thermistor or the like, which is connected to the (energizing) coil of the control valve V through a control circuit G. When it is adapted for a room temperature control system, the temperature sensor S is placed at the spot where the room temperature is detected, and when applied for a hot water supplier, it is located at the hot water outlet. In accordance with the present invention, it is arranged that the magnitude of the pulse current to be applied to the energizing coil for the flow rate control valve V from the control circuit G is controlled in accordance with changes in the ambient temperature as detected by this temperature sensor S, so that the opening of the flow rate control valve V may be shifted continuously so as to selectively control the quantity of fuel gas to be supplied to the burner B, thus maintaining the room temperature or hot water temperature at a desired constant level. If the quantity of gas to be supplied to the burner B is too small, there is a fear of incomplete combustion or a risk of going out, and therefore, it is arranged that even when the flow rate control valve V is closed completely, a minimum quantity of fuel gas is supplied which is selected to be enough to prevent such incomplete combustion or the like problem from occurring.

Figure 2:
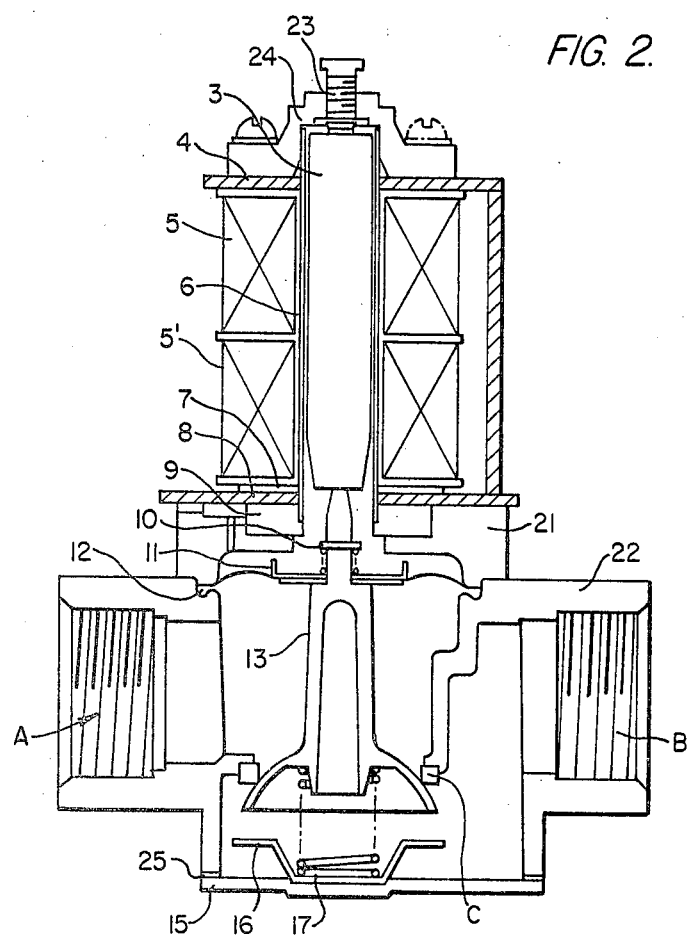
FIG. 2 is a vertical cross-sectional view showing a control valve for continuously controlling the gas flow rate.

FIG. 2 is a vertical cross-sectional view showing the practical construction of the gas flow rate control valve V shown in FIG. 1, in which a valve body 22 is shown formed with an inlet A, an outlet B and a valve hole C provided between the inlet and the outlet, through which valve hole C a valve stem 13, of the tapered form, passes. Between the valve body 22 and the top cover 21, there is sandwiched a diaphragm 12 adapted to separate the gas passages, and the valve stem 13 is urged against the diaphragm 12 by using a return spring 17. Upon the top cover 21, there is mounted a solenoid assembly which comprises a first energizing coil 5 and a second energizing coil 5'. There is provided a plunger (a movable core) 3 extending across the both energizing coils 5 and 5' therethrough, both energizing coils 5 and 5' being surrounded snugly by a common yoke (a magnetic frame) 4. The plunger 3 is mounted upon the head portion of the valve stem 13 above the diaphragm 12.

When the energizing coils 5 and 5' are in a non-conductive state, the tapered valve stem 13 is pushed upwardly by the return spring 17, thus the valve hole C is closed by the large-diametered portion of the stem. At the same time, the plunger 3 is also pushed up by the urging force rendered by the return spring 17 for closure. When the energizing coils 5 and 5' are energized, the plunger 3 is now attracted downwardly, and such a force is also effected upon the valve stem 13, and the valve 13 is forced downwardly against the return spring 17. The small-diametered portion of the tapered valve stem 13 is thereby caused to move toward the valve hole C, and, thus, the valve hole C is now opened.

The opening of the valve hole C at this moment is determined in accordance with the quantity of a current passing through the coils 5 and 5', and now the manner of such valve operation will be explained together with the reason why the plunger 3 is attracted by the coils 5 and 5'. FIGS. 3(A1) and 3(A2) are the diagrams showing the waveforms of the currents which pass through the energizing coils. More specifically, FIG. 3(A1) shows the waveform of the current passing the first energizing coil 5, while FIG. 3(A2) shows the waveform of the current passing the second energizing coil 5'. It is noted from the waveforms shown in FIGS. 3(A1) and 3(A2) are periodically repeating rectangular pulses. Firstly, it is arranged that the coils 5 and 5' are alternately fed with current pulses in such a manner that the coil 5 is fed with such a pulse of current while the coil 5' is turned off, and vice versa. Secondly, the manner of passing such currents through these coils is such that the direction of magnetic flux would become opposite when the coil 5 is fed with the current as shown in FIG. 3(A1) and when the coil 5' is fed with the current as shown in FIG. 3(A2). It has been found that the ratio of the widths of pulses A1 and A2 is appropriate in the range of from 1:2 to 1:3, and these pulse currents are fed alternately to the coils 5 and 5' with a relatively short cycle of 6 to 10 ms, and in such a manner that the direction of the magnetic flux of one coil is opposite to that of the other. At this moment, as long as the period of these pulses are constant, there is no change in the magnitude of magnetic force even though the direction of such magnetic fluxes are reversed, and therefore, the plunger 3 is attracted to move over to and stop at a given position as determined by such a magnetic force. Therefore, it is now practicable, with a constant frequency, to control the magnitude of such current pulses with the detection signal from the temperature sensor, and in this particular embodiment, this latter system is adopted as shown typically in FIG. 6, accordingly.

Since the direction of magnetic flux at the energizing of the first coil 5 is opposite to that at the energizing of the second coil 5', the plunger 3 and the yoke 4 of the magnetic material constructiong the magnetic circuit have the direction of their magnetization repeatedly reversed in accordance with the cycle of the energizing current. As a consequence, as typically shown in the hysteresis curve of FIG. 4(b), it is possible in practice to constantly obtain the equal opening of the control valve with the same energizing current. FIG. 4(a) is the characteristic curve which represents the relationship between the energizing current A and the valve opening St of the conventional continuous controlling electromagnetic valve, while FIG. 4(b) is the characteristic curve which represents the relation of the energizing current A and the valve opening St of the one according to the present invention. In the conventional electromagnetic valve, it is impracticable to avoid the problem of magnetic hysteresis, there would occur a substantial hysteresis on the part of the valve opening St; it is noted that there is a substantial difference in the opening St of the valve as plotted with the points St1 and St2, even with the same current 1' when compared the case in which the energizing current is increasing the case in which it is decreasing. More specifically, taking a temperature of 20° C., for example, there would exist a substantial difference in the valve opening when this temperature point is reached as it comes down from the higher temperatures and as it goes up from the lower temperatures, as shown by the points St1 and St2, and therefore, this system cannot be applied in practice to the temperature control. In contrast, according to the present invention, it is advantageous that in either situation, as the energizing current A increases or as it decreases, the magnetic circuit would constantly repeat at a high frequency, in accordance with the present invention, with respect to its direction of magnetization, so as to thereby clear away such hysteresis, the energizing current gradually increasing or decreasing as it clears away the hysteresis. Therefore, it is to be noted that the valve opening St is found to be substantially constant irrespective of whether the current value I' is increasing or decreasing, as far as this current value remains to be identical.

Next, the removal of the static friction rendered upon the plunger is practiced in such a manner to give a positive oscillating motion to the plunger. More specifically, under the condition that the plunger 3 rests motionless and in contact with the surrounding yoke, plunger guide or the like, and at the moment that the plunger 3 is to be driven as the energizing current changes in accordance with the current temperature changes, the plunger 3 is caused to be oscillated in the axial direction thereof. The plunger under such an oscillating condition can now be driven at an immediate relationship between the attractive force of magnetism and the given urging force of the return spring 17, free from any substantial effect of friction force as compared with the case that it remains in a stationary contact relationship with the yoke or the like, whereby the practical problem of aberration between the effect of energizing current and the valve opening due to the static friction as otherwise encountered may be accordingly solved. Also, under the effect of static friction, it is inevitable that the motion of the plunger would rather come to be intermittent and jerking. In contrast, according to the present invention, the motion of the plunger can be made smooth and without interruption.

In the embodiment of the present invention, in order to have the plunger oscillated in motion, it is arranged that the time periods of energization of the first coil 5 and the second coil 5' are different as typically shown in FIGS. 5(c) and 5(d), so as to thereby unbalance the magnetic attractive forces generated on both coils 5 and 5'. With such an arrangement, as the magnetic attraction periodically increases and decreases, the plunger is caused to be oscillated, accordingly.

FIG. 6 shows an example of the control circuit which is designed to produce such waveforms of the energizing current as shown in FIGS. 5(c) and 5(d), and also to change the intensity of the energizing current in accordance with the changes in the ambient temperature. T and T' designate terminals which are connected to a dc power source. The dc voltage applied across the terminals T and T' is turned into a constant voltage by a Zener diode ZD through a resistor R1. The dc voltage thus processed so as to be a constant voltage is now applied to the supply terminal t3 of a timing IC 14 and the like. A diode D1 and a resistor R2 are connected in parallel across the input terminals t1 and t2 of the timing IC 14. A resistor R3 is connected across the terminals t3 and t1, and a timing capacitor C1 is connected across the terminals t2 and T'. The output terminal t4 of the timing IC 14 is connected through a resistor R4 to the base of a switching transistor Tr3. The collector of this transistor Tr3 is connected through a resistor R5 to the base of the transistor Tr1 which is used for driving the coil 5. The collector of this transistor Tr1 is connected through a resistor R6 to the base of the transistor Tr2 which is used for driving the coil 5'. The other terminals of the coils 5 and 5' are connected to the cathode of a diode D2, a variable resistor VR and a thermistor S for detecting the temperature. The anode of the diode D2 is connected to the emitter of a transistor Tr4, and the other ends of the variable resistor VR and the thermistor S are connected to the base of a transistor Tr5. It is noted that the transistors Tr4 and Tr5 are connected in a Darlington circuit configuration. A constant current diode D3 is connected across the base and the collector of the transistor Tr5.

With such a circuit construction, when the timing capacitor C1 is charged with the dc voltage as generated across the Zener diode ZD through the resistor R3 and the diode D1, the voltage appearing across the timing capacitor C1 increases gradually. Then, when the charging voltage of the timing capacitor C1 rises up to a predetermined level or higher, the thus-obtained charge on the timing capacitor C1 is discharged, by function of the circuit construction of the timing IC 14, through the loop comprising the resistor R2, the input terminal t1 and the GND terminal t5 of the timing IC 14, thereby reducing the voltage across the timing capacitor C1. As this cycle of charging and discharging is repeated, a sawtooth waveform appears across the timing capacitor C1 as typically shown in FIG. 5(a). As a consequence thereof, it is noted that a voltage is cyclically produced, said voltage comprising a series of rectangular pulses occurring at the output terminal t4 of the timing IC 14, as typically shown in FIG. 5(b). Upon the delivery of a high level of pulse voltage from the output terminal t4, the transistor Tr3 is turned on. Then, the voltage at the base of the transistor Tr1 decreases, thus turning it off, and the transistor Tr2 is now turned on, thereby making the second coil 5' conductive. Next, when the pulse signal from the output terminal t4 of the timing IC 14 becomes zero, the transistor Tr3 is then turned off. Accordingly, as the base voltage of the transistor Tr1 increases, this particular transistor Tr1 is now turned on, the first coil 5 being made conductive. Thereupon, the voltage at the base of the transistor Tr2 now decreases, this transistor being turned off and the second coil 5' being not energized. In this manner, these coils 5 and 5' are rendered to be respectively conductive and non-conductive according to the state of the pulses from the output terminal t4 of the timing IC 14, as typically shown in FIGS. 5(c) and 5(d). FIG. 5 (c) represents the waveform of the voltage applied to the first coil 5, and FIG. 5(d) representing that of the voltage applied to the second coil 5'. As is apparent from the graphic representation, the time period of energization for the second coil 5' is about twice as long as that for the first coil. Consequently, it is noted that the magnetic flux as appears in the second coil 5' is greater than that of the first coil 5 in FIG. 2, the thus-obtained alternating cycles of magnetic forces turning out to be stronger or weaker pulses, and the biasing effect of the return spring cooperating therewith to give the desired oscillating motion to the plunger 3.

The magnitude of the energizing currents applied to the coils 5 and 5' is controlled by changing the extent of biasing of the transistors Tr4 and Tr5 connected in the Darlington circuit relationship so as to control the collector current of the transistor Tr4, through the adjustment of the resistance values of the thermistor S determined with the temperature of the position where it is located and of the variable resistor VR connected in parallel with the thermistor S. With such adjustments so as to attain a proper current passing through the coils 5 and 5', when the temperature of the thermistor S becomes higher, there is eventually provided the smaller resultant resistance value in combination of the thermistor S and the variable resistor VR, since the thermistor S is of the reverse characteristic type in which the resistance value is reduced as the temperature increases. On the other hand, as the current which passes through the thermistor S and the variable resistor VR remains constant, the biasing voltage between the transistors Tr4 and Tr5 now comes down, and the base current at the transistor Tr5 is decreased, thus decreasing the current passing through the coils 5 and 5', and the plunger 3 is moved toward the valve closing direction. On the contrary, when the temperature gets lower, the resistance value of the thermistor S becomes greater, thus increasing the composite resistance value of the thermistor S and the variable resistor VR, and thus rendering the biasing voltage of the transistors Tr5 and Tr4 greater, the resultant current passing the base of the transistor Tr5 increasing and hence the current through the coils 5 and 5' increasing. As a consequence thereof, the plunger 3 is moved in the valve opening direction against the urging force of the return spring 17. In this manner, the flow rate of fuel gas is decreased as the ambient temperature goes up, while the flow rate is increased as the temperature comes down, thus maintaining the temperature at a desired constant level.

Also, it is arranged that if there should be a short-circuiting between the terminals on the part of the transistors Tr1 and Tr2 of the coils 5 and 5' or between the coils 5 and 5' and the terminal T' (GNC), since the current passing in the biasing section through the constant current diode D3 remains constant, there is no possibility that the biasing voltage would change by any other factor than the changes in the resistance of the thermistor. As a consequence thereof, there occurs no current in the coils 5 and 5' other than the constant current as determined from the temperature detected by the thermistor, and in addition, when splashed with water or the like in the hot water supplier application and thus resulting in a short-circuiting in the control circuit, there is no risk of an overcurrent occurring which would damage the circuit elements.

Now, according to the present invention, in the system which is adapted to continuously control the flow rate of fuel gas in accordance with changes in the ambient temperature, since it is arranged for the plunger for driving the valve stem to be positively oscillated, and also for the direction of magnetization of the magnetic circuit to be reversed constantly, the static friction which is rendered upon the plunger is removed by the oscillation of the plunger and the problem of the magnetic hysteresis is solved by the regular reversing of the magnetization, and, thus, the opening of the flow control valve is controllable with accuracy and smoothness in accordance with changes in the temperature. In addition, since there is no allowed overcurrent in the energizing coils which is larger than the value which is predetermined by the thermistor, there is no risk in handling, even if a short-circuit is caused in the circuit. Moreover, it is possible in practice to provide a gas flow rate control system with a high reliability which is simple in construction and also less expensive in cost, and which is adjustable with ease and accuracy only in its electric circuit.

What is claimed is:
1. A gas flow rate control system comprising:
a temperature sensing means for monitoring an environment to be controlled;
an electromagnetic-type flow rate control valve means including a return spring for urging a valve stem to its closing position, a plunger for driving the valve stem, and a pair of energizing coils for generating magnetic attractive forces so as to move the plunger against the force of the return spring;
an energizing-current control circuit means for applying energizing currents to said pair of energizing coils, said currents being in the form of pulse signals which are increased or decreased in response to temperature changes detected by said temperature sensing means, said currents controlling the opening and closing of said flow rate control valve;
said pulse signals being alternately applied to said pair of energizing coils so as to repeatedly reverse the directions of magnetization caused by said pair of energizing coils, wherein magnetic hysteresis is eliminated from said flow rate control valve; and
said pulse signals alternately applied to said pair of energizing coils being different in duration so as to unbalance said magnetic attractive forces generated by said respective energizing coils, and thereby causing said plunger to oscillate at the zero point of magnetic force which occurs at the moment of shifting from the magnetic force generated by one of said pair of energizing coils to the magnetic force generated by the other of said pair of energizing coils, wherein static friction of the plunger of said flow rate control valve is eliminated.

* * * * *